J. C. WILSON, DEC'D.
G. E. WILSON, EXECUTRIX.
TIME STAMP.
APPLICATION FILED APR. 27, 1910.
1,300,909.
Patented Apr. 15, 1919.
5 SHEETS—SHEET 2.
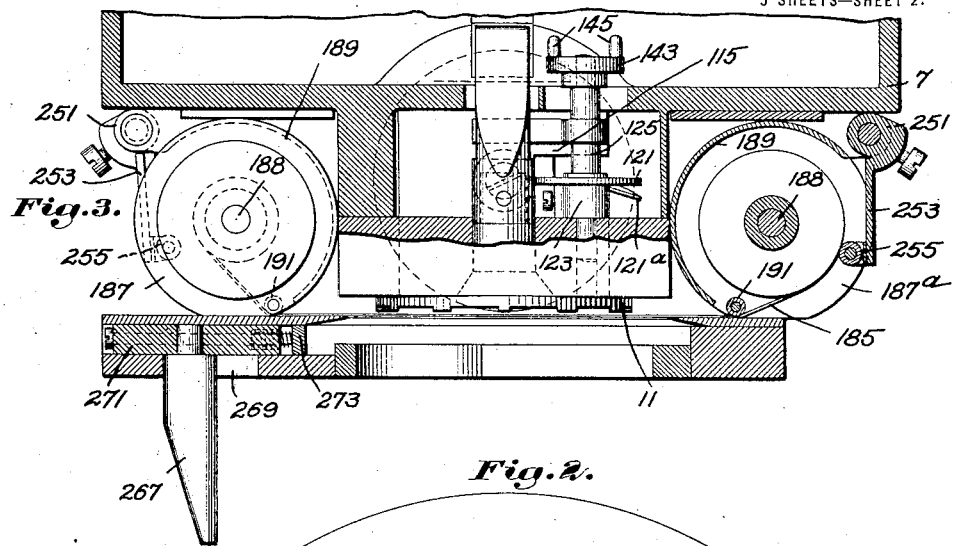
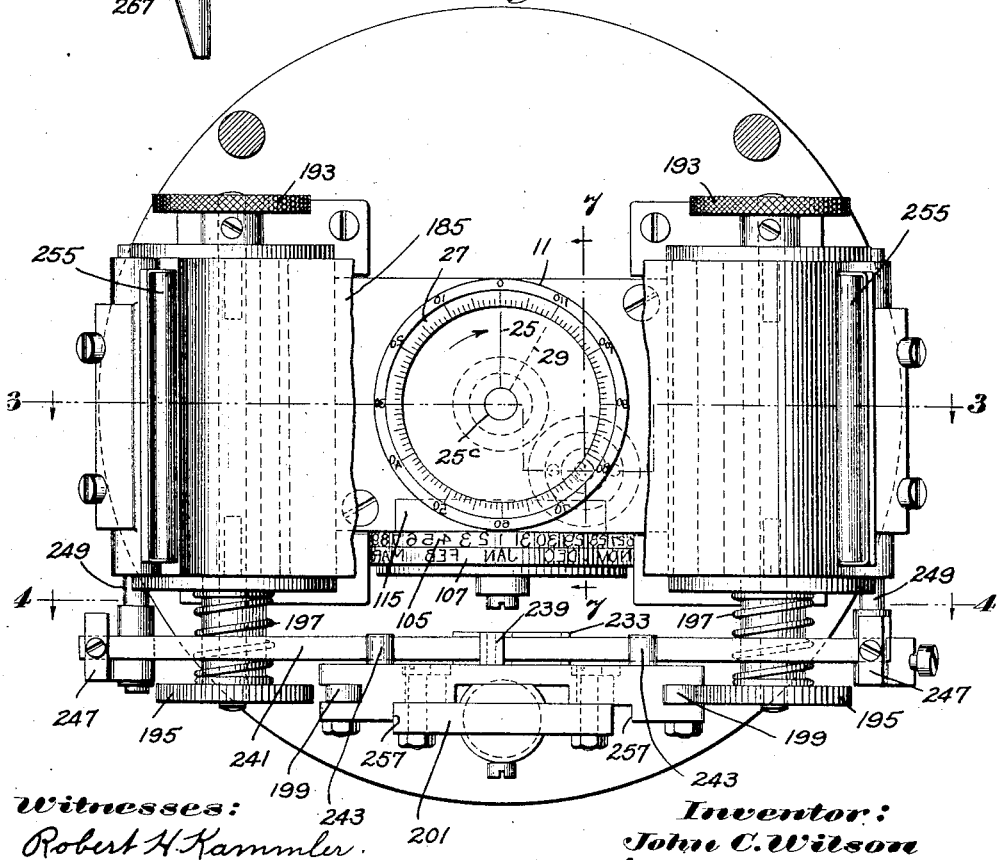

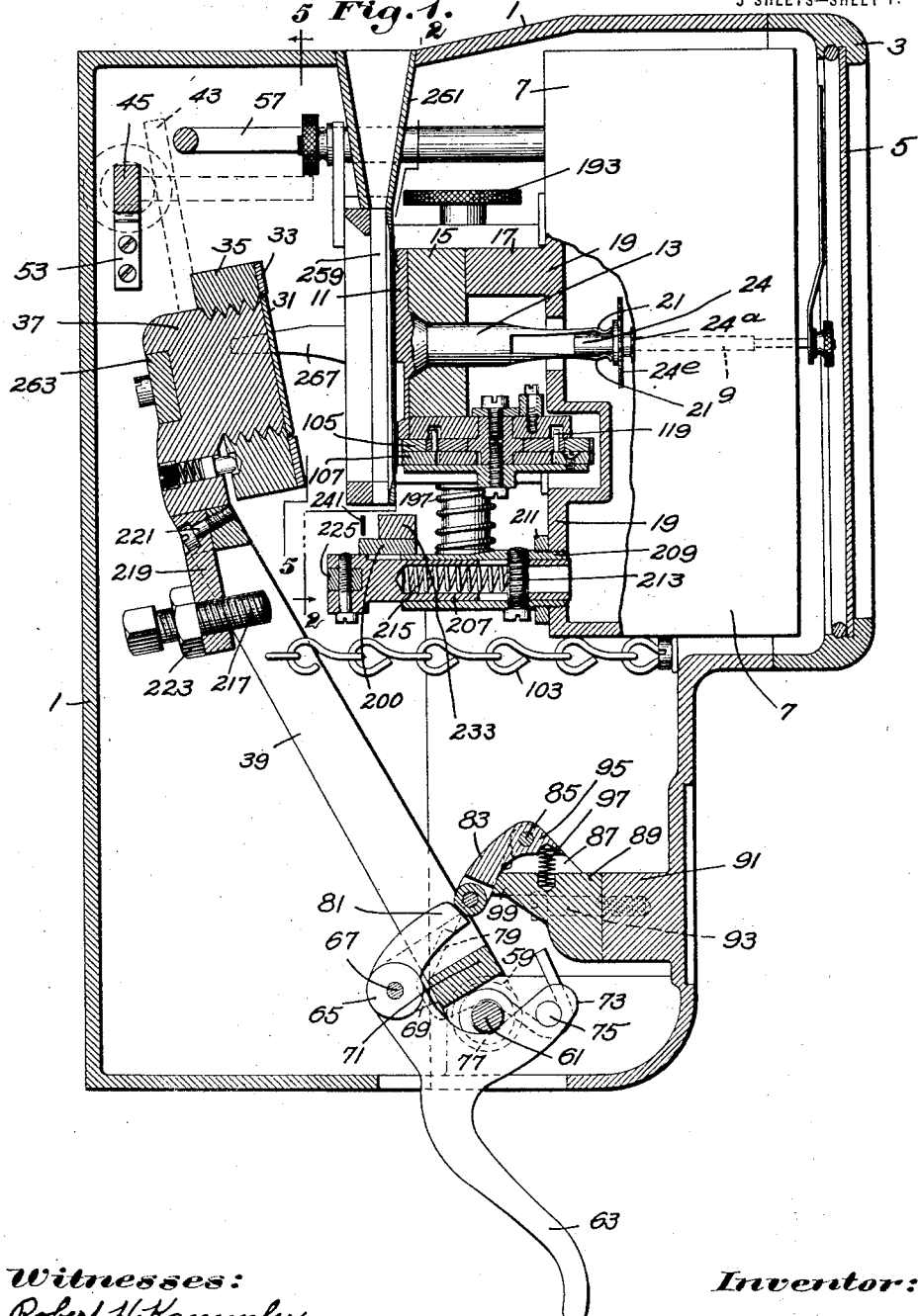

J. C. WILSON, DEC'D.
G. E. WILSON, EXECUTRIX.
TIME STAMP.
APPLICATION FILED APR. 27, 1910.
1,300,909.
Patented Apr. 15, 1919.
5 SHEETS—SHEET 3.
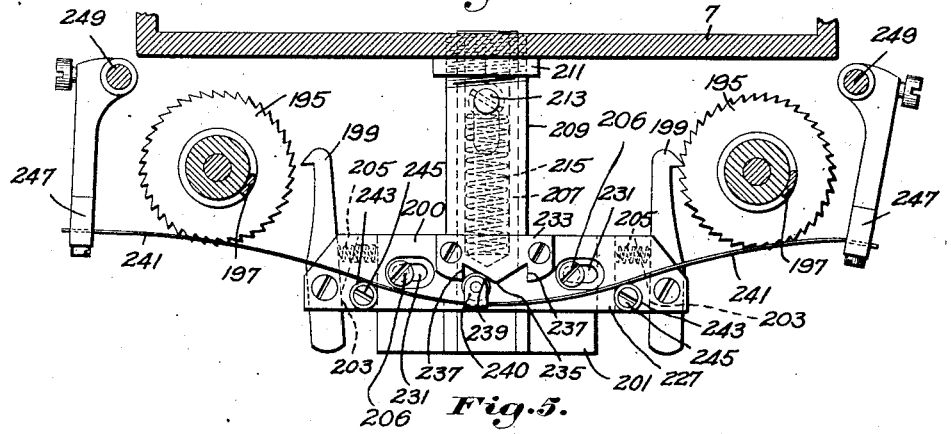
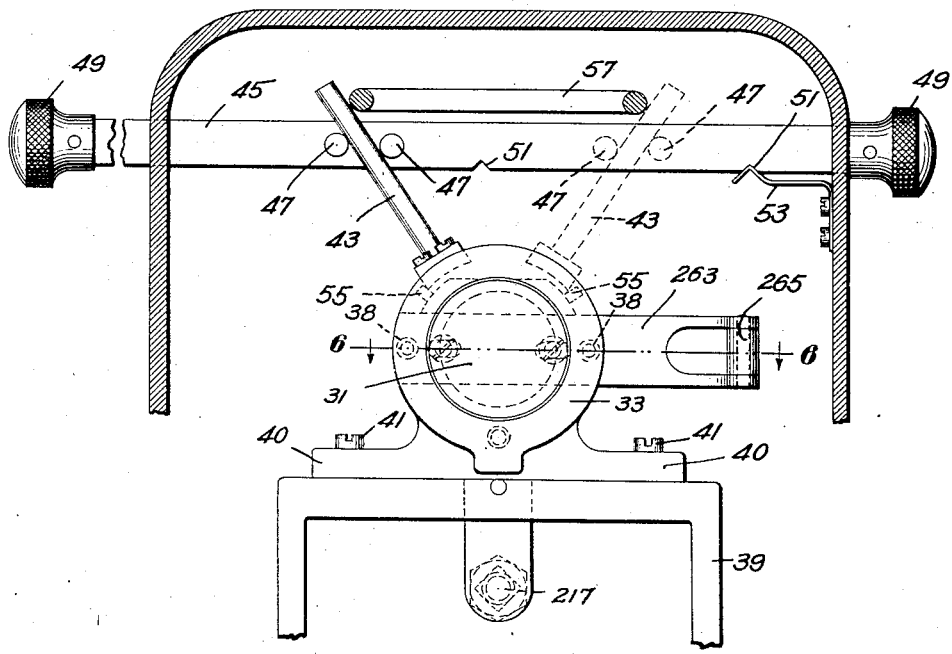
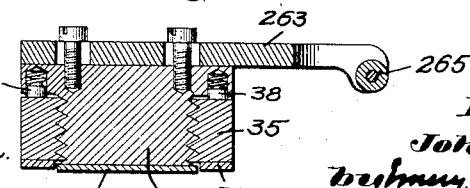
Witnesses:
Robert H. Kammler
Ernest A. Telfer
Inventor:
John C. Wilson
by Bryan, Booth, James & Varney
att'ys.

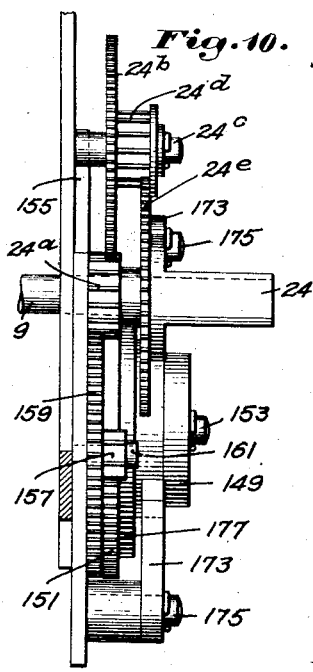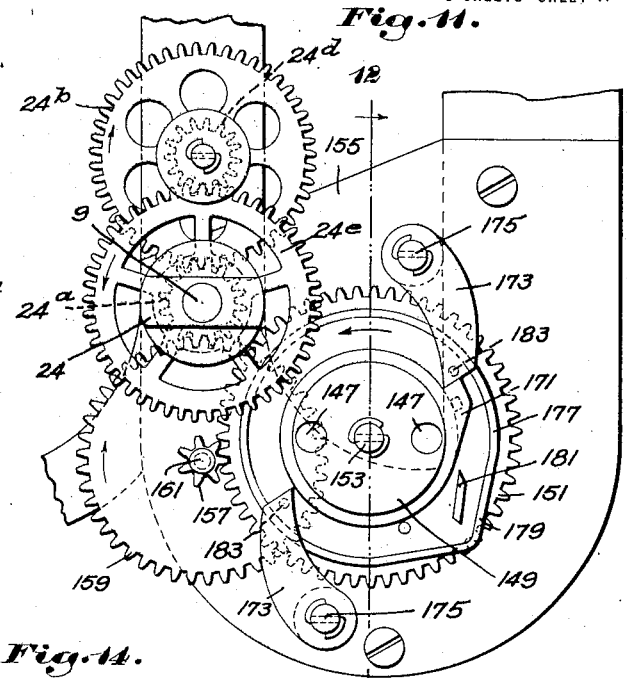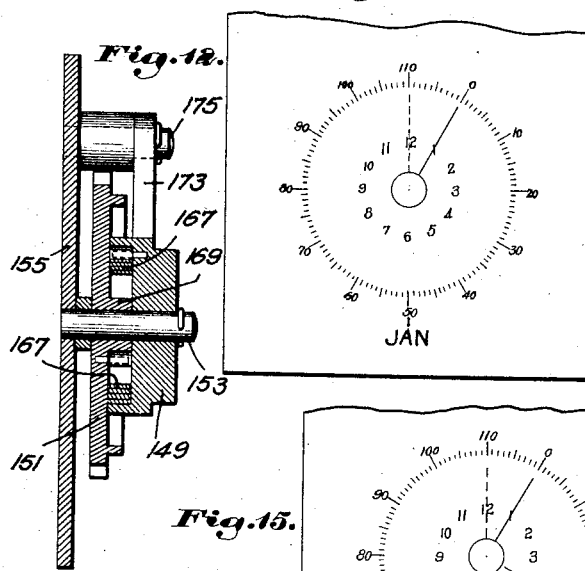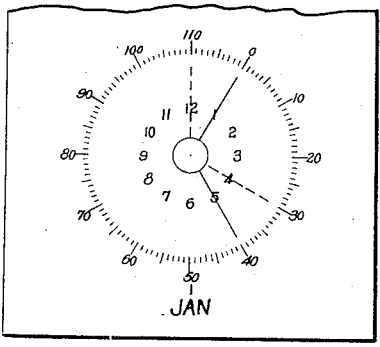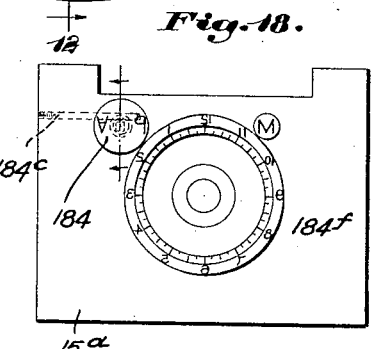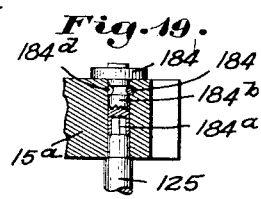

J. C. WILSON, DEC'D.
G. E. WILSON, EXECUTRIX.
TIME STAMP.
APPLICATION FILED APR. 27, 1910.
1,300,909.
Patented Apr. 15, 1919.
5 SHEETS—SHEET 5.
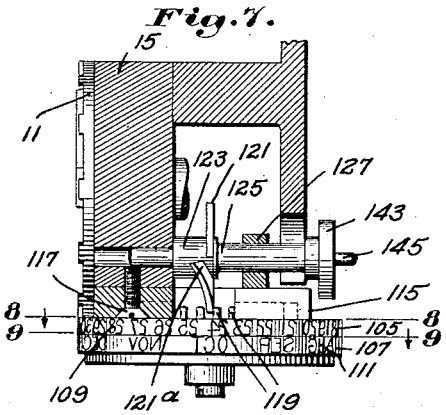
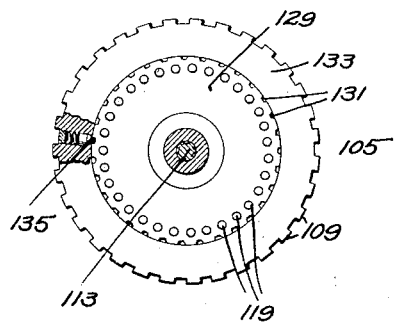
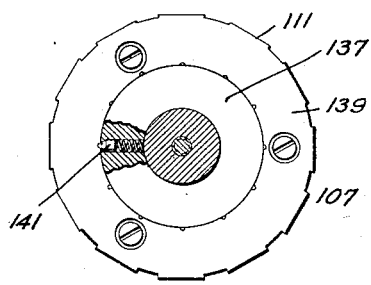
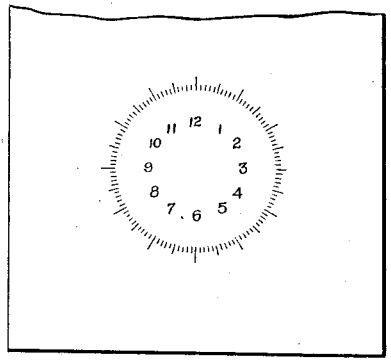
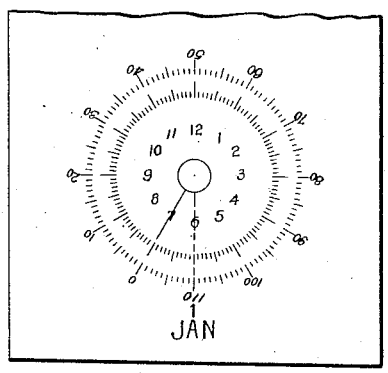
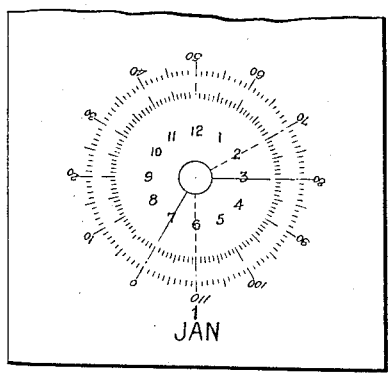
Witnesses:
Robert H. Kammler.
Ernest A. Telfer
Inventor
John C. Wilson
by Emery, Booth, Janney & Varney
att'ys.

UNITED STATES PATENT OFFICE.

JOHN C. WILSON, OF BOSTON, MASSACHUSETTS; GRACE E. WILSON, EXECUTRIX OF SAID JOHN C. WILSON, DECEASED.

TIME-STAMP.

1,300,909.      Specification of Letters Patent.      Patented Apr. 15, 1919.

Application filed April 27, 1910. Serial No. 557,918.

*To all whom it may concern:*

Be it known that I, JOHN C. WILSON, a citizen of the United States, and a resident of Boston, in the county of Suffolk, State of Massachusetts, have invented an Improvement in Time-Stamps, of which the following description, in connection with the accompanying drawings, is a specification, like letters on the drawings representing like parts.

This invention relates to time stamps and the like and, among other objects, aims to provide a machine which automatically computes and records the duration of a time interval.

The character of the invention may be best understood by reference to the following description of an illustrative embodiment thereof shown in the accompanying drawings, wherein:

Figure 1 is a vertical section through an illustrative time stamp embodying the invention;

Fig. 2 is a vertical section taken on line 2—2 of Fig. 1, looking toward the right of said figure, with the inking ribbon broken away to disclose a die to be described;

Fig. 3 is a horizontal section taken on the irregular line 3—3 of Fig. 2;

Fig. 4 is a section taken on the line 4—4 of Fig. 2;

Fig. 5 is a section taken on line 5—5 of Fig. 1 looking toward the left of said figure;

Fig. 6 is a section taken on line 6—6 of Fig. 5;

Fig. 7 is a section taken on line 7—7 of Fig. 2;

Fig. 8 is a section taken on line 8—8 of Fig. 7;

Fig. 9 is a section taken on line 9—9 of Fig. 7;

Fig. 10 is a side elevation of a date die actuating mechanism;

Fig. 11 is a side elevation of Fig. 10;

Fig. 12 is a section taken on line 12—12 of Fig. 11;

Fig. 13 shows a printed card which may be used in connection with the machine;

Figs. 14 and 15 illustrate a card which has received time imprints in the machine;

Figs. 16 and 17 show a card differently printed;

Fig. 18 shows an imprinting die provided with a meridian die; and

Fig. 19 is a section taken on line 19—19 of Fig. 18.

Referring to the drawings, in which like characters represent the same parts in the several figures, the illustrative machine shown herein as embodying the invention comprises (Fig. 1) a casing 1 provided with a door or bezel 3 which may be provided with a face 5 of glass or other transparent material for disclosing a usual time dial (not shown). Within the casing 1 is secured a second casing 7 containing a time train (not shown) having a main shaft 9. This shaft is used not only to drive the hands of the clock but by my invention is also used to rotate a time imprinting die, comprising a disk-like plate 11 fast on or integral with a stem 13 journaled in a block 15 which may be screwed or otherwise secured to a base 17 projecting from the rear clock or time plate 19 of the casing 7. To provide a separable driving connection (Fig. 1) between the die 11 and the shaft 9, the end of the die stem is provided with opposed resilient fingers 21 adapted to straddle a flattened sleeve 24 rotatively mounted on said shaft 9. This sleeve (Figs. 10 and 11) is driven by said shaft by a gear train (Figs. 10 and 11) comprising a pinion $24^a$ fast on said main shaft 9 and meshing with a large gear $24^b$ journaled on a stud $24^c$ on the main frame 19 of the clock. Secured to the gear $24^b$ is a pinion $24^d$ driving a large gear $24^e$ fast on a hub of the sleeve 24. It will be apparent that by the separable connection between the die stem and the sleeve 24 the die may be readily removed and adjusted relatively to the shaft 9 to positions conforming to the clock reading.

The die 11 includes a time index or hand 25 (Fig. 2), herein extending radially from a circle $25^c$. It will be apparent that as the die rotates this hand will rotate, and if a card (Fig. 13) bearing the stamp of a clock dial be stamped by said hand, the latter would indicate on the card the hour, or hour and fraction thereof, corresponding to the time of the stamping operation. If later the hand is again printed on the same card the space between the two phases or imprints of the hand will indicate the duration of time between said imprints. A time card may be conveniently used bearing a dial such as shown in Fig. 13. This dial comprises spaced numbers from one to twelve, the spaces between the numbers being divided into fractions. To permit a ready calculation of the time elapsing between successive imprints, preferably the space between each hour is divided into fourths or tenths, the card in Fig. 13 being shown divided into tenths. It will thus be apparent that if the hand 25 makes an imprint at some point between integral hours the position of the hand read in connection with said fractions will indicate the hour and fraction thereof.

To indicate at a glance without any calculation the exact time during which the operative has worked the die 11 is provided with a computing dial 27 (Fig. 2). Herein this dial comprises radial graduations separated at spaces or increments equivalent to one-tenth of an hour, it being understood, however, that other fractions may be used as desired. Every tenth graduation is marked numerically, the numbers running from 1 to 120. This dial herein is integral with the hand 25 and so positioned with respect thereto that the hand 25 always points to the zero reading of said dial.

It may be supposed that successive imprints are made, on said card, such, for example, as shown in Figs. 14 and 15. First, the operative inserts his card in the machine and stamps the same, as more fully hereinafter described, at one o'clock. The full line hour hand 25 will then point in the position shown in Fig. 14 to one o'clock. If, for example, the operative ceases his work or finishes a particular piece of work on which he is engaged at five o'clock he again inserts his card in the machine and when imprinted the card will appear as shown in Fig. 15 with the full line hand pointing to five o'clock and to number four on the computing dial, thereby indicating that the operative worked four hours. It will thus be seen that the zero position of the computing dial moves with and is always opposite the hour hand in position to mark the commencement of a time period which is to be measured, the second reading of the hand 25, pointing to the graduations on the computing dial, indicating the amount of the elapsed time since the first imprint.

One of the features of my invention comprises provision whereby the card may indicate automatically the exact time during which the operative has worked excluding a predetermined time interval such, for example, as a period occupied for lunch. To this end the die is provided with an additional hand 29 (Fig. 2) herein distinguished from the hand 25 by a dotted or broken line, said hand being set in a position lagging behind the hour hand 25, the space between said hands being equivalent to the duration of a time interval such as it is desired to exclude from the computed time. Herein the hand 29 is spaced from the hand 25 a distance corresponding to one hour such, for example, as the lunch hour. These hands 25 and 29 when the space between them is once determined are fixed in relationship and herein constitute integral parts of the die and therefore rotate together.

If, for example, the operative commences work at seven o'clock in the morning and continues to work until three o'clock in the afternoon taking an hour out for lunch, it will be apparent that the two readings of the full line hand would not denote the exact amount of time spent in actual work, but the lunch hour would be included in this interval. The second reading, therefore, in such case, is made with reference to the broken line, lagging hand 29. In the illustrative card shown in Figs. 16 and 17 the operative commenced work and stamped his card at seven o'clock, thereby making an imprint of the hand 25 pointing to seven and of the computing scale 27 with its zero graduation opposite seven. The operative discontinued work at three o'clock and again stamped his card making a second imprint as shown in Fig. 17, having in the meantime taken an hour for lunch. The broken line hand 29 in this instance points to number seven on the computing dial thereby indicating at a glance that seven hours were spent in actual work.

In the illustration chosen an even number of hours was spent in work, but if an even number and a fraction was so spent the hands would, of course, point to positions between integral hours, the fraction of an hour being readily read by the tenths graduations between the hours.

As stated above, the computing dial rotates or moves with the hour hand 25 and is in fixed relationship therewith, but the dial should be imprinted only on the initial imprint, for example, when the operative is commencing work. The second imprint or the imprint when the operative has finished his work, should be made of the hands only, excluding the dial and indicating the amount of elapsed time following the initial imprint.

The initial imprint including the hands 25 and 29 and the dial 27, and subsequent imprint including only the hands 25 and 29, herein are obtained, by my invention, with a differential platen which I will now describe, referring more particularly to Figs. 1, 5 and 6. This platen comprises two relatively movable parts, one part being herein in the form of a central disk 31 while the other part is in the form of an annulus 33 encircling said disk. The disk 31 presents a face of sufficient extent to cover the hands 25 and 27 while the annulus portion of the platen presents a face of sufficient extent to cover the computing dial 29 and a date die to be described. As shown in Fig. 1 the disk and annulus are in active alinement in position to print. If the platen now be pressed against the die 11 both the computing dial and the hands will be imprinted as required for the initial imprint. In making the second imprint the hands only should be imprinted. To this end the annulus portion of the platen may be retreated or adjusted relatively to the central portion. This is effected herein by mounting the platen annulus 33 on a ring 35 the latter being interiorly threaded on a reduced end of a head 37 carrying the platen disk 31, said head being secured to a rocking frame 39 by suitable screws 41 (Fig. 5) in wings 40 projecting laterally from said head. When the ring is turned, the face of the platen 33 may be brought in line with the face of the disk platen 31, or the platen 33 may be withdrawn from alinement with said platen 31. To permit the adjustment of the platen parts from the exterior of the casing 1 referred to, the ring 35 herein is provided with an actuating arm 43 secured thereto and projecting upwardly therefrom. This arm 43 may be rocked to shift the platen annulus part by a sliding rod 45 projecting through guide openings in the casing and provided with pins 47 between which the arm 43 projects. The ends of said rod are provided with knobs or handles 49 for sliding the rod 45 in opposite directions. When the arm 43 is in its full line position (Fig. 5) the platen parts are in alinement in position for the initial imprint. When the arm 43 is rocked to its dotted line position as by thrusting the rod 45 to the right the annulus platen part will be retracted out of alinement from the central platen part 31 and as a result the computing dial will not be printed but the hands only will be printed. To hold the ring 35 in its positions of adjustment without slipping on the head 37 said ring is provided with a brake or retarding device herein in the form of spring pressed pins 38 (Fig. 6) engaging the rear face of the ring 35, said pins and springs occupying recesses in the head 37. To accurately position the arm adjusting rod 45 said rod may be provided with indentations 51 coöperating with an angular end of a leaf spring 53 secured to the interior of the casing 1, said angular end being adapted to seat itself in one or the other of said indentations according to the position of the rod 45. The rocking movement of the arm 43 may be limited by stop screws 55 threaded into said head 37.

To prevent imprinting operations, excepting when the platen parts are in one or the other of the positions described, a bridge guide rod 57 may be provided which will permit the platen frame 39 to be brought forward to print only when said arm 43 is rocked to its right or left position.

The platen carrying frame is provided at its lower end with fulcrum ears 59 depending therefrom and apertured to receive a shaft 61 journaled at its ends in bearings in the casing 1. Said frame may be rocked forwardly to make an imprint by a hand lever 63 (Fig. 1) depending through an opening in the base of the casing 1. To rock the platen forwardly to make an imprint with a sharp, quick movement, the hand lever 63 is not rigid with the platen arm 39 but is separate therefrom and is forked at its inner end, one arm 65 of the fork being fulcrumed on a shaft 67 mounted in ears 69 projecting laterally from a lower transverse frame member 71 of the platen arm 39 while the other arm 73 of said hand lever carries a pin 75 engaged by one end of a helical spring 77 encircling the shaft 61, the opposite end 79 of said spring being in engagement with the transverse frame member 71. The fulcrum arm 65 of the fork is provided with a forwardly projecting trigger 81 which is normally engaged by the roller end of a stop 83 pivoted on a pin 85 in ears 87 projecting upwardly from a bracket 89 secured to a block 91 on said frame by suitable screws 93. This stop is provided with a tail piece 95 which is engaged by a spring 97 tending to rock said stop against the forward end 99 of said bracket 89.

When the hand lever 63 is pulled to the left of Fig. 1, the trigger 81 in engagement with the end of the stop 83 will be rocked but a small distance while the arm 73 is being rocked a considerable distance due to the distance of said arm from the fulcrum 67. The rocking of the arm 73 will energize the helical spring 77 and said spring will tend to rock the platen arm 39 in a clockwise direction toward the die 11. This rocking movement of the arm 39, however, will be delayed until the trigger 81 has rubbed past the stop 83, the occurrence of this event removing the opposition to the rocking movement of the arm, whereupon the previously energized spring will rock said platen arm sharply forward against the die 11 to make an imprint. The retreat movement of the arm 39 after imprinting may be limited by a chain 103 connected at one end to the arm 39 and at its other end to the casing 1.

To print the day and month simultaneously with the initial imprint of the die 11, there is provided a date die (Figs. 1, 2 and 7) herein comprising a days disk 105 and a months disk 107, the disk 105 being provided on its periphery with die numbers 109 (Fig. 8) indicating the days of the month and the months disk being provided with die abbreviations 111 of the months (Fig. 9). These disks are fulcrumed on a short shaft 113 journaled in a plate 115 (Fig. 7) projecting laterally from the die block 15 referred to, said plate being secured to said block by suitable screws 117. To rotate the days disk the inner face of the latter is provided with a series of spaced short pins 119 arranged in a circle. To turn said days disk through said pins incrementally or step-by-step there is provided an interrupted cam collar 121 on a hub 123 fast on a shaft 125 having a bearing for one of its ends in the block 15 and a bearing for its opposite end in a lug 127 projecting laterally from the plate 115 referred to. Said collar 121 is adapted to rotate between adjacent pins 119 on the days disk and is provided with a straight portion and an offset portion 121$^a$ whereby once in each rotation of the shaft 125 the days disk will be rotated one increment to change the calendar.

In case the clock should stop or it should be desired to change the date with respect to the die, the days disk is not made of integral construction, but comprises a central disk 129 (Fig. 8) provided with peripheral indentations 131 at intervals corresponding to the numbers of the days on the periphery of the days disk, and a ring 133 encircling said central disk and provided with a spring pressed dog 135 projecting radially inward from said ring 133 and adapted to slick past the indentations 131 to accurately position said ring at points corresponding to imprinting positions of the numbers on the periphery of said ring.

For a similar reason the months disk is not of integral construction but comprises a central disk 137 and an outer ring 139 encircling said central disk said outer ring being provided on its inner periphery with spaced indentations corresponding to the positions of the months on the periphery of said ring the central disk being provided with a spring pressed dog 141 adapted to slick past the indentations on said ring to determine the positions of arrest for the adjustment of said ring.

The days disk, of course, should be advanced an increment once in every twenty-four hours. By my invention this is automatically effected herein by connections with the time train which I will now describe. The cam collar or date changing shaft 125 is provided with coupling pins 145 projecting from the face thereof, said pins normally occupying similarly shaped holes 147 (Fig. 11) in the face of a drum 149. This drum is turned by a gear train comprising a large gear 151 (Fig. 11) loosely mounted on a stud 153 (Fig. 12) projecting from the face of a plate 155, within the clock casing. Said gear 151 meshes with a pinion 157 (Fig. 11) which rotates with a large gear 159 on a stud shaft 161 on said plate 155, said gear 159 in turn meshing with the pinion 24$^a$ (Fig. 10) fast on the main shaft 9 of the clock. By this train of gears the gear 151 is turned once in every twenty-four hours. The rotative movement of the gear 151 is not transmitted directly to the date changing shaft 125, but the rotation of said gear is utilized to tension a spring which is released once in every twelve hours to effect a quick, partial rotation of the drum 149. To this end the drum 149 contains a coil spring 167 (Fig. 12) encircling a hub 169 of the gear 151 and having one end secured to said gear and the other end secured to said drum. The drum 149 is provided on its periphery with a ratchet tooth 171 (Fig. 11), adapted to engage one or the other of two pawls 173 fulcrumed on pins 175 on said plate 155, said pawls being normally pressed in toward the periphery of said drum 149 by suitable springs encircling said studs. The face of the gear 151 is provided with a cam flange 177 which is circular throughout a greater part of its length but is provided at one portion with an outward extension 179 opposite which is a cam lug 181 projecting from the face of the gear 151 and adapted to coöperate with pins 183 depending from the pawls 173 to actuate said pawls in a manner which I will now describe. The rotation of the gear 151 in the direction of the arrow in Fig. 11 will energize the spring 167 until the cam lug 181 engages the pin 183 of one or the other of the pawls 173 whereupon such pawl will be rocked outwardly from engagement with the ratchet tooth 171 the outward movement of said pawl being limited by the cam flange 177, the pin 183 moving into the outward flange extension 179. The tripping of the pawl from the ratchet tooth 171 will permit the previously energized spring 167 to rotate the drum 149 with a sharp, quick turn of 180° until said ratchet tooth 171 engages the nose of the diametrically opposite pawl 173. This sudden, quick movement of the drum 149 will be transmitted to the date changing shaft 125 through the coupling pins 145 at a time when the offset portion 121$^a$ of the cam ring 121 referred to will be active to engage the short pins 119 on the days disk 109 and will change the date with a quick, sudden movement in order that a date may not be changed during an imprinting operation. The continued rotation of the gear 151 will cause the spring 167 again to be tensioned and to be subsequently released by the engagement of the cam lug 181 with the other pawl 173, as before, and the drum will be given another quick turn through an arc of 180°. But during this second turn, the straight portion of the cam collar 121 will be between pins 119 of the days disk and as a result this rotation of the date changing shaft 125 will be without effect on the days disk.

In some instances it is desirable to imprint A. M. or P. M. indicating at which side of the meridian the imprint was made. To this end a stationary die character M (Fig. 18) for representing the meridian may be mounted on a die plate 15$^a$. Die characters A and P may be adjustably mounted so that one or the other may be read with the letter M. Herein the letters A and P are mounted on a rotative die member or disk 184 (Figs. 18 and 19). At the end of every twelve hours this disk is given a half turn causing the letters A and P to exchange positions. The platen should be of sufficient extent to print but one of the letters A and P at a time. The letters may be shifted every twelve hours by a very simple device which I will now describe. It will be recalled that the date change shaft 125 (Fig. 7) described is caused to make a quick half turn every twelve hours. This movement is utilized by my invention to shift the letters A and P. To this end said shaft is provided with a squared coupling end 184$^a$ (Fig. 19) adapted to receive a similarly shaped, hollowed end of a stem 184$^b$ on the A. P. disk 184. Longitudinal movement of said stem when coupled to said shaft may be prevented by a pin 184$^c$ set transversely to the stud and engaging a peripheral groove 184$^d$ therein. It will be apparent that each time the date changing shaft 125 makes a quick 180° turn the A, P disk will receive a like movement to change the indication from A. M. to P. M. at the proper time. When this A. M., P. M. die is used a smaller dial 184$^f$ (Fig. 18) than that shown in Fig. 2 may be used.

Another feature of my invention comprises improved means for feeding the inking ribbon. Referring more particularly to Figs. 2, 3 and 4 the inking ribbon 185 is wound on rollers 187, 187$^a$, fast on shafts 188 journaled in the ends of open-sided, cylindrical housings 189 located at opposite sides of the die 11 referred to, said housings being secured to the time train case 7. The ribbon extends from one roll to another across the face of the die 11 and may be guided by rollers 191 journaled in said housings. Fast on the ends of the shafts 188 are hand wheels 193 (Fig. 2) having knurled peripheries providing for manual adjustment of said ribbon rollers. The opposite ends of these shafts are provided with ratchets 195 (Figs. 2 and 4) the rotation of the inking rollers 187 being frictioned by helical springs 197 encircling the roller shafts and pressed between the ratchets 195 and the ends of the roll housings 189.

In accordance with my improved ribbon feed one or the other of said ratchets 195 is advanced step-by-step each time the platen is brought forward to make an imprint. To this end pawls 199 (Fig. 4) are pivoted in bifurcated ends of a narrow plate 200 mounted to slide longitudinally on the head 201, said pawls being normally pressed against stops 203 by springs 205 seated in recesses in said plate. The plate is connected to the head 201 by pins 206 occupying elongated slots in said plate and threaded into said head. This head is mounted on a hollow plunger 207 adapted to reciprocate in a hollow column 209 threaded into the time train casing and secured thereto by a set nut 211 (Fig. 1). This hollow plunger 207 is slotted to receive a transverse pin 213 threaded into said column. The head 201 is normally pressed outwardly by a helical spring 215 (Fig. 4) contained within said hollow post and confined between the head 201 and the pin 213, the outward movement of the post being limited by the engagement of an end of its slot with the pin 213. This spring when energized and released throws the head outwardly causing one or the other of the pawls 199 to advance one or the other of the ratchets 195 an increment. The spring 215 is energized to effect such movement of the pawls each time that the platen arm 39 is rocked forward to make an imprint. To this end the rocker arm 39 is provided with an adjustable hammer 217 (Figs. 1 and 5) threaded into a lug 219 depending from an upper transverse member of the arm 39 and secured thereto by a suitable screw 221. The hammer 217 may be held in its positions of adjustment by the set nut 223. The blow of the hammer on the forward movement of the rocking arm 39 is received by an anvil portion 225 of said head 201. It will be apparent that each time that the platen comes forward the hammer 217 will strike the anvil 225 thrusting the head carrying post 207 into the column 209 against the resistance of the spring 215, the backward movement of said platen permitting said spring to advance the pawls as described.

It will be apparent that but one of the pawls should be effective to transmit a rotative feed to one of the inking rolls at a time. One of the features of my improved inking ribbon feed comprises provision whereby one of the inking rollers is rotated until filled and then the feed is automatically shifted to the opposite roller and the direction of feed of the ribbon is automatically changed. To shift the pawls from an effective to an ineffective position and vice versa, to the plate 200 is secured a cam plate 233 (Fig. 4) having a central cam elevation 235 and stops 237 at the ends of the declivities of the cam elevation. Co-operating with the latter is a cam roller 239 pivoted in a lug 240 secured to a ribbon-like spring 241 which is guided by rollers 243 on studs 245 projecting from the face of the plate 200. The ribbon projects beyond the ends of said plate and is adjustably secured in the ends of rocking arms 247 in turn adjustably secured to shafts 249 journaled in boss bearings 251 (Fig. 3) on the roller casings 189. Also adjustably secured to said shafts 249 are plate-like arms 253 having follower rollers 255 journaled in their outer free ends. These follower rolls are adapted to press against the inking ribbon wound on the rollers and as the ribbon accumulates on a roller, one of the arms 253 is rocked outwardly thereby drawing the ribbon-like spring 241 longitudinally with it until the cam roller 239 rides to the summit of the cam elevation 235 whereupon the pressure on the spring ribbon 241 due to its mounting will cause said spring to flex, thereby tensioning or energizing the latter, and as a result, the moment said roller passes said summit, said roller will coöperate with said cam declivities to slide the pawl carrying plate 200 on the head 201 causing one of the pawls to be thrown out of engagement with its ratchet and the other of said pawls to be thrown into engagement with its ratchet. The sliding movement of the plate 227 may be limited by stop shoulders 257 (Fig. 2) on said plate. A reciprocation of the head 201 as occasioned by the printing operations of the platen will cause the pawl thus actively positioned to be effective to rewind the inking ribbon on its roll until sufficient material has accumulated thereon to engage the follower 255 and rock the latter, causing the cam follower 239 to ride back to the top of said cam elevation, thereby again tensioning the ribbon spring 241 and causing the pawl carrying plate 227 to be shifted in the opposite direction and cause the opposite roll to be wound as before.

By the described device the inking ribbon is fed an increment after each imprint is made, thereby distributing the wear on the ribbon. Its direction of feed is automatically reversed so that the rolls continue to wind and unwind alternately and indefinitely without requiring any attention other than to replace the ribbon when it is exhausted or worn out.

The card to be imprinted may be introduced in a card holder frame 259 (Fig. 1) said card holder being provided with a hopper-like mouth 261. To accurately position the card in said frame on the forward imprinting movements of the platen, the platen head 37 is provided with a lateral arm 263 carrying a roller 265 (Fig. 6) at its outer end which is adapted to engage the inclined face of a positioning finger 267 projecting through a slot 269 in said frame 259, said finger 267 being fast on a sliding plate 271 mounted in said frame and adapted to be slid laterally to position the card on its introduction therein and the operation of the platen as described. This positioning plate 271 may be provided with a yielding spring pressed guide 273 to contribute to the accurate positioning of the card without buckling of the latter.

In operation the operative on commencing work introduces his card into the holder 261. One of the knobs 49 of the platen adjusting rod 45 is then slid to adjust the platen annulus and central disk in alinement, said position being conveniently indicated by the word "Start" marked on a portion of the rod 45 projecting exteriorly of the casing. The hand lever 63 is then pulled, first energizing the spring 77 and then subsequently rocking the platen sharply forward to make an imprint on the card of the hands and the computing dial. The operative then removes the card from the machine and when he has completed his work he again inserts the same card in the machine and shifts the platen adjusting rod 45 to offset the platen annulus to the rear of the central disk portion of the platen, the adjustment of the rod for this purpose being conveniently indicated by the word "Stop" marked on said rod exteriorly of the casing. He then pulls the hand lever 63 as before, making a second imprint on the card, but this time the hands only will be imprinted. The card having thus received two successive imprints will indicate the duration of the time which the operative worked and if such period of time included a lunch hour or other interval to be deducted from the total time a glance at the card will indicate the net time worked, merely by looking at the computing dial and the hands without the necessity of any calculation whatever.

It will be understood that the invention is not limited to the particular embodiment shown herein but various modifications may be made without departing from the spirit and scope of the invention.

Claims:

1. A machine of the class described comprising, in combination, spaced leading and lagging time indexes in fixed relation; and provision for operating the same as a unit to make imprints of different time phase.

2. A machine of the class described comprising, in combination, an imprinting die including spaced time indexes in fixed relation; a computing dial coöperating therewith; and provision for making an initial imprint of said indexes and said dial and a second imprint of said indexes exclusive of said dial.

3. A machine of the class described comprising, in combination, a die including a graduated dial having numerical characters thereon; spaced time indexes in fixed relation, one of said indexes being in alinement with the zero graduation on said dial; and means for making an initial imprint of said dial and indexes and a second imprint of the latter exclusive of said dial.

4. A machine of the class described comprising, in combination, a die including a computing dial and indexes; provision for rotating said dial and indexes in unison as a unit according to different time phases; and means to make an initial imprint which includes said dial and one of said indexes and a second imprint which includes said other index but excludes said dial.

5. A machine of the class described comprising, in combination, a die including a computing scale; an advance index; a second index lagging a predetermined distance behind said advance index; provision for making an initial imprint of said scale and said indexes and provision for making an imprint of said indexes exclusively of said scale.

6. A machine of the class described comprising, in combination, a die including a computing scale; indexes of different appearance spaced to correspond to a predetermined time interval; provision for operating said indexes to positions of different time phase; and means for making an initial imprint of said scale and indexes and a second imprint of said indexes exclusive of said scale.

7. A machine of the class described comprising, in combination, a clock controlled die and a platen coöperating therewith comprising a plurality of parts threaded together to permit their relative adjustment to effect imprinting of different portions of said die.

8. A machine of the class described comprising, in combination, a clock controlled die and a platen coöperating therewith comprising a central part and an annular part threaded thereon to permit imprinting of different portions of said die.

9. A machine of the class described comprising, in combination, a clock controlled die and a platen coöperating therewith comprising a central part; an external part threaded thereon; and provision for turning the latter about the former to permit imprinting of different portions of said die.

10. A machine of the class described comprising, in combination, a clock controlled die and a platen coöperating therewith comprising a central disk; an annular part threaded thereon; and provision for turning said annular part on said disk whereby to adjust said platen for imprinting by one or both of said parts.

11. A machine of the class described comprising, in combination, a clock controlled die; a platen coöperating therewith comprising two parts threaded together; and provision for turning one of said parts on the other to bring said parts into alinement for making one imprint and adjusting said parts out of alinement for making another imprint.

12. A machine of the class described comprising, in combination, a clock controlled die and a platen coöperating therewith comprising two parts threaded together; an operating arm connected to one of said parts and provision for rocking said arm relatively to adjust said parts to permit imprinting of different portions of said die.

13. A machine of the class described comprising, in combination, a casing; a clock controlled die therein and a platen coöperating with the latter comprising two parts threaded together and provision for relatively adjusting said parts from the exterior of said casing to permit imprinting of different portions of said die.

14. A machine of the class described comprising, in combination, a clock controlled die; a platen comprising a plurality of parts; provision for relatively adjusting said parts to effect imprinting of different portions of said die; and means for preventing imprinting operations excepting when said platen parts are in predetermined positions of adjustment.

15. A machine of the class described comprising, in combination, a clock controlled die; a platen coöperating therewith comprising a plurality of parts; provision for relatively adjusting said parts to permit imprinting of different portions of said die; and a bridge bar for preventing imprinting operations excepting when said platen parts are in predetermined positions of adjustment.

16. A machine of the class described comprising, in combination, a clock controlled die; a platen coöperating therewith comprising a fixed part and an adjustable part and means for turning the latter on the former to permit imprinting of different portions of said die.

17. A machine of the class described comprising, in combination, a clock controlled die; a two-part platen; provision for relatively adjusting said parts to permit imprinting of different portions of said die; and means for retarding said adjustment.

18. A machine of the class described comprising, in combination, a clock controlled die, and a platen coöperating therewith comprising two parts threaded together; a rocking arm secured to one of said parts and provision for turning said arm relatively to adjust said parts to permit imprinting of different portions of said die.

19. A machine of the class described comprising, in combination, means to make time indicating imprints; a time train for operating the same to make imprints of different time phase; a wheel having date imprinting characters thereon; a series of pins projecting from said wheel and an interrupted cam collar coöperating with said pins and operated by said time train for incrementally advancing said wheel.

20. A machine of the class described comprising means for printing a dial scale 27 and a radial index 25 indicating the zero point of said scale, a time train and connections thereof to shift said printing means whereby the position of said index 25 will indicate the time of printing and means for printing alternatively a radial index 29 without said dial scale but coöperating with the dial scale first printed and arranged to indicate by its angular position a time predeterminately differing from the time of printing.

21. A machine of the class described comprising, in combination, die means; a handle moved platen for making successive imprints of said die; and means independent of said handle for varying the effective imprinting surface of said platen.

22. A machine of the class described comprising, in combination, die means; provision for moving the same to positions of different time phase; a platen; a handle for moving the latter to make successive imprints of said die on an imprint receiving sheet; and means independent of said handle for varying the effective imprinting surface of said platen.

23. A machine of the class described comprising, in combination, die means; provision for turning the same to positions of different time phase; a handle moved platen for making imprints of said die; and means independent of the latter for varying the effective imprinting surface of said platen without interfering with the imprinting movements thereof.

24. A machine of the class described comprising, in combination, die means; provision for turning the same to positions corresponding to different time phase; a rocking platen for making imprints of said die; and means supported independently of said platen for acting on the latter to vary the effective imprinting surface thereof.

25. A machine of the class described comprising in combination, die means including a graduated dial and index means movable therewith for making imprints of different time phase, platen means for making an imprint from said dial and index means and then making an imprint from said index means exclusive of said dial, and a single handle for operating said platen means to produce both of said imprints.

26. A machine of the class described comprising in combination, die means including a graduated dial, means for moving said die means to positions of different time phase, and an index continuously indicating the zero reading of said dial, platen means for making first an imprint from said dial and index and then an imprint from said index excluding said dial, and a single handle for operating said platen means to produce both of said imprints.

27. A machine of the class described comprising in combination, die means including a graduated dial and index means, means for moving said die means to positions of different time phase, a differential platen, means for adjusting said platen in readiness to print first said dial and index and then said index exclusive of said dial, and a handle for operating said platen to produce both of said imprints.

28. A machine of the class described comprising in combination, die means, means for moving the same to positions of different time phase, plural part platen means, means to set said parts in different fixed positions of adjustment, a handle for operating said platen, and means independent of said handle for maintaining said parts in said position.

In testimony whereof, I have signed my name to this specification, in the presence of two subscribing witnesses.

JOHN C. WILSON.

Witnesses:
ROBERT H. KAMMLER,
HENRY T. WILLIAMS.